(12) United States Patent
Yanagawa (10) Patent No.: US 9,205,930 B2
(45) Date of Patent: Dec. 8, 2015

(54) INCLINATION DETECTION DEVICE FOR AIRCRAFT, AND METHOD FOR LOADING AND UNLOADING CARGO USING SAME

(75) Inventor: Hiroki Yanagawa, Nagoya (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 39 days.

(21) Appl. No.: 14/122,762

(22) PCT Filed: Jun. 1, 2011

(86) PCT No.: PCT/JP2011/062637
§ 371 (c)(1),
(2), (4) Date: Dec. 19, 2013

(87) PCT Pub. No.: WO2012/164708
PCT Pub. Date: Dec. 6, 2012

(65) Prior Publication Data
US 2014/0097297 A1   Apr. 10, 2014

(51) Int. Cl.
*G08B 21/00* (2006.01)
*B64D 45/00* (2006.01)
(Continued)

(52) U.S. Cl.
CPC ...... *B64D 45/00* (2013.01); *B64D 9/00* (2013.01); *G01G 19/07* (2013.01); *G01M 1/125* (2013.01)

(58) Field of Classification Search
CPC ..... G01M 1/125; G01M 1/127; G01M 17/00; G01M 17/04; G01C 21/18; G08G 5/065; G08G 5/06; B64D 2045/0085; B64D 45/00; B64D 9/00; B64C 19/00; B64C 25/58; G01G 19/07
USPC ......... 340/500, 945, 946, 958, 971, 982, 983; 73/178 H, 178 T; 244/17.11, 24, 26, 31, 244/36, 100 R, 117 R, 118.1, 119, 137.1; 701/3
See application file for complete search history.

(56) References Cited

U.S. PATENT DOCUMENTS 6,432,229 B1* 8/2002 Asai et al. .................. 148/511
2005/0061569 A1* 3/2005 Pascolo et al. ............ 180/271
(Continued)

FOREIGN PATENT DOCUMENTS

JP  56-93017 A  7/1981
JP  62-187696 A  8/1987
(Continued)

OTHER PUBLICATIONS

International Search Report for Application No. PCT/JP2011/062637 dated Sep. 6, 2011.

*Primary Examiner* — Kerri McNally
(74) *Attorney, Agent, or Firm* — Pearne & Gordon LLP (57) ABSTRACT

An inclination detection device 11 for an aircraft includes a gravity sensor 13 that detects an inclination angle in a pitch direction at a parking time of a fuselage 1, an alarm device 16, and a control unit 17 that causes the device 16 to issue an alarm when the inclination angle detected by the sensor 13 approaches allowable limit inclination angles F4 and R4 in a forward inclination direction and a backward inclination direction of the fuselage 1. The control unit 17 has gravity center management information peculiar to the fuselage 1 inputted therein by a USB memory 20 or the like, and corrects a movable range in the forward and—backward inclination directions until the inclination angle reaches the angles F4 and R4 based on the gravity center management inclination information, before a loading and unloading operation of cargo into and from the fuselage 1.

10 Claims, 3 Drawing Sheets

(51) Int. Cl.
  *B64D 9/00* (2006.01)
  *G01M 1/12* (2006.01)
  *G01G 19/07* (2006.01)

(56) References Cited

U.S. PATENT DOCUMENTS

| | | | |
|---|---|---|---|
| 2008/0119967 A1* | 5/2008 | Long et al. | 701/3 |
| 2009/0261203 A1* | 10/2009 | Gouette et al. | 244/137.1 |
| 2010/0044515 A1* | 2/2010 | Neto | 244/135 C |
| 2010/0063718 A1* | 3/2010 | Schmidt | 701/124 |
| 2010/0100225 A1* | 4/2010 | Reed et al. | 700/213 |
| 2010/0121560 A1* | 5/2010 | Vetsch | 701/124 |

FOREIGN PATENT DOCUMENTS

| | | |
|---|---|---|
| JP | 2-501562 A | 5/1990 |
| JP | 2001-328598 A | 11/2001 |
| JP | 2010-261798 A | 11/2010 |

* cited by examiner

INCLINATION DETECTION DEVICE FOR AIRCRAFT, AND METHOD FOR LOADING AND UNLOADING CARGO USING SAME

TECHNICAL FIELD

The present invention relates to an inclination detection device for an aircraft and a method for loading and unloading cargo using the same, which enable a luggage handler to grasp an inclination state of a fuselage when loading and unloading cargo into and from an aircraft, and prevent a tailstrike accident and a nose landing gear breakage accident of the fuselage.

BACKGROUND ART

At a parking time of an aircraft, operations of boarding and alighting of a crew and passengers, loading and unloading of cargo and baggage, loading of fuel, loading and unloading of goods to be served such as in-flight meals (in an official demand aircraft, equipment for mission and the like), loading of clean water, discharge of dirty water and the like are performed, and therefore, change in the attitude mainly in a pitch direction (movement in a forward inclination direction and a backward inclination direction with the vicinity of the center of gravity of a fuselage as a center) and vertical motion occur.

In general, in the weight and balance design of a fuselage, sufficient consideration is also given so that a fuselage keeps a stable attitude, in consideration of external factors (surface wind, snow coverage, engine slip streams of other aircrafts passing nearby and the like), in addition to the above-described change of the attitude.

Further, in the case where sufficient countermeasures cannot be taken with only consideration in specification design as typified by a cargo plane, the operation procedures are sometimes set so that an aircraft does not have an extremely pitch-up attitude. For example, such operation procedures are applied that after a cargo compartment at a fuselage front side is filled, cargo is loaded into a cargo compartment at a fuselage rear side, or while a fuel loading amount into a fuel tank located inside a main wing does not reach a predetermined amount, loading into a cargo compartment at a fuselage rear side is not started.

The landing gear of an aircraft is constituted of three gears that are a pair or a plurality of main landing gears set at a slightly rear side from a center in a longitudinal direction of a fuselage, and a nose landing gear provided in the vicinity of a front end portion of a fuselage. At a parking time, the main landing gears support approximately 90% of a fuselage weight, and the nose landing gear supports a remainder of about 10%. Since cargo compartments are provided at a front side and a rear side of the main landing gears, if the loading amount into the cargo compartment at the rear side becomes excessive, a so-called tailstrike accident occurs, in which the nose landing gear rises, and a fuselage rear portion touches the ground.

On the contrary, if the loading amount into the cargo compartment at the front side from the main landing gears becomes excessive, it leads to a so-called nose landing gear breakage accident, in which the nose landing gear that has the strength for only carrying about 10% of the fuselage weight as described above and is configured to be as light as possible is broken. Both a tailstrike accident and a nose landing gear breakage accident have to be absolutely avoided since an enormous trouble occurs to the subsequent operation, and enormous cost is required for repair of the fuselage.

Conventionally, in order to prevent a tailstrike accident of a fuselage, a support pole that is called a tail stanchion has been interposed between a tail portion of the fuselage and the ground to prevent the tail portion of the fuselage from lowering, and a measure called tethering that monitors the rising degree of a nose landing gear has been taken. Tethering is a method in which a rope is loosely extended from the ground to be laid on a nose landing gear, a specific observer monitors a degree of tension thereof, and if the front portion of the fuselage rises and the rope is stretched, the observer warns a luggage handler who performs loading and unloading of cargo.

SUMMARY OF INVENTION

Technical Problem

However, the airport and the aircraft that can prevent a tailstrike accident by using a tail stanchion are limited to the airports equipped with tail stanchions, and aircrafts capable of using tail stanchions, and in the airports equipped with no tail stanchion and the aircraft incapable of using tail stanchions, the fear of occurrence of a tailstrike accident cannot be excluded. Note that since a tail stanchion is a heavy thing, it is impossible to load a tail stanchion into an aircraft and carry it.

Meanwhile, tethering can be performed in any airport by simple equipment, but a specific observer needs to be positioned to monitor the tension degree of a rope, and therefore, in the airports without sufficient stuff, tethering is likely to be neglected.

Further, according to use of a tail stanchion, and implementation of tethering, the event can be avoided, that the center of gravity of the fuselage moves backward to cause a tailstrike accident, but conversely, the event is difficult to avoid, that the center of gravity of the fuselage moves forward to cause a nose landing gear breakage accident.

As above, as one of the causes of the center of gravity of the fuselage excessively moving to cause a tailstrike accident and a nose landing gear breakage accident, it is cited that the luggage handlers who perform loading and unloading of cargo that significantly changes the position of the center of gravity of a fuselage cannot grasp the attitude of the fuselage that changes every time and moment.

The present invention is made in the light of the circumstances as above, and has an object to provide an inclination detection device for an aircraft that enables a luggage handler who loads and unloads cargo into and from an aircraft to grasp an inclination state of a fuselage, prevents a tailstrike accident and a nose landing gear breakage accident of a fuselage, and enables smooth performance of an operation of loading and unloading cargo, and a method for loading and unloading cargo using the same.

Solution to Problem

An inclination detection device for an aircraft according to a first invention for solving the aforementioned problem includes inclination angle detection means that detects an inclination angle in a pitch direction at a parking time of a fuselage, an alarm, and control means that causes the alarm to issue an alarm when the inclination angle detected by the inclination angle detection means approaches allowable limit inclination angles in a forward inclination direction and a backward inclination direction of the fuselage.

According to the above described configuration, even if the inclination angle in the pitch direction of a fuselage approaches the limit inclination angle of the fuselage when a luggage handler who loads and unloads cargo into and from a fuselage performs a loading and unloading operation in accordance with the set procedures, an alarm is issued from the alarm, and therefore, the luggage handler can temporarily stop the loading and unloading operation and can confirm the present situation of the fuselage attitude. Therefore, a tailstrike accident and a nose landing gear breakage accident of the fuselage can be prevented.

Further, the inclination detection device for an aircraft according to a second invention is such that in the aforementioned first invention, the control means has gravity center management information peculiar to the fuselage inputted therein, and corrects a movable range in the forward inclination direction and the backward inclination direction until the inclination angle reaches the limit inclination angles based on the gravity center management information, before a loading and unloading operation of cargo into and from the fuselage.

According to the above described configuration, if the gravity center management information that is changed at each flight is inputted into the control means, the control means corrects the movable range in the forward inclination direction and the backward inclination direction until the inclination angle reaches the limit inclination angles again, based on the information.

Consequently, for example, when the gravity center position of the fuselage already leans to the rear side, the movable range to the limit inclination angles is shifted to the front side, whereby if loading and unloading by which the center of gravity is further shifted to the rear side is performed, an alarm is issued earlier. The same thing applies to the case in which the gravity center position of a fuselage already leans to the front side. Accordingly, a tailstrike accident and a nose landing gear breakage accident of the fuselage can be reliably prevented.

The inclination information of a fuselage may be inputted into the control means by a ten key operation or the like, or may be inputted into the control means from other information devices by a storage medium such as a USB (Universal Serial Bus) memory.

Further, the inclination detection device for an aircraft according to a third invention, in the aforementioned first invention, can be placed in an arbitrary place of the fuselage.

According to the above described configuration, the inclination detection device is placed in the cargo compartment, or in a vicinity thereof, and an alarm can be reliably recognized by the luggage handler who loads and unloads cargo into and from the fuselage, whereby safety is enhanced, and a loading and unloading operation of the cargo can be smoothly performed.

Further, the inclination detection device for an aircraft according to a fourth invention has, in the aforementioned first invention, vibration isolation means that isolates vibration from the fuselage, between the inclination angle detection means and the fuselage.

According to the above described configuration, the vibration accompanying external wind, loading of cargo, boarding and alighting of passengers and the like is isolated from the inclination angle detection means. Therefore, an unnecessary alarm (erroneous alarm) is prevented from being issued, and a loading and unloading operation of cargo can be smoothly performed.

Further, the inclination detection device for an aircraft according to a fifth invention is such that, in the aforementioned first invention, intensity of the alarm issued by the alarm is increased stepwise as the inclination angle of the fuselage approaches the limit inclination angles.

According to the above described configuration, the luggage handler who loads and unloads cargo into and from the fuselage can recognize that the limit of the inclination angle approaches, and at the same time, the luggage handler can load and unload cargo so that the limit of the inclination angle recedes conversely, and therefore, the luggage handler can smoothly perform the loading and unloading operation without suspending it.

Further, the inclination detection device for an aircraft according to a sixth invention is such that, in the aforementioned first invention, a kind of the alarm issued by the alarm differs depending on whether the inclination direction of the fuselage is the forward inclination direction or the backward inclination direction.

According to the above described configuration, the luggage handler who recognizes an alarm can know the inclination direction of the fuselage, and therefore, can release the alarm by immediately loading and unloading the cargo so that the fuselage inclines in the opposite direction. Therefore, a loading and unloading operation can be smoothly performed without being suspended.

Further, a method for loading and unloading cargo according to the present invention is such that a luggage handler who loads and unloads cargo into and from a cargo compartment of a fuselage performs a loading and unloading operation of the cargo while obtaining gravity center management information of the fuselage by the inclination detection device for an aircraft according to the present invention.

According to the above described method, since the luggage handler who performs a loading and unloading operation of cargo can work while grasping the gravity center management information of a fuselage, a tailstrike accident and a nose landing gear breakage accident of the fuselage are prevented, and a loading and unloading operation of cargo can be smoothly performed.

Advantageous Effect of Invention

As above, according to the inclination detection device for an aircraft, and the method for loading and unloading cargo using the same, according to the present invention, when a luggage handler loads and unloads cargo into and from an aircraft, the luggage handler is enabled to grasp the inclination state of a fuselage, a tailstrike accident and a nose landing gear breakage accident of the fuselage are prevented, and a loading and unloading operation of cargo can be smoothly performed.

DESCRIPTION OF EMBODIMENT

Hereinafter, an embodiment of the present invention will be described with reference to the drawings.

Figure 1:
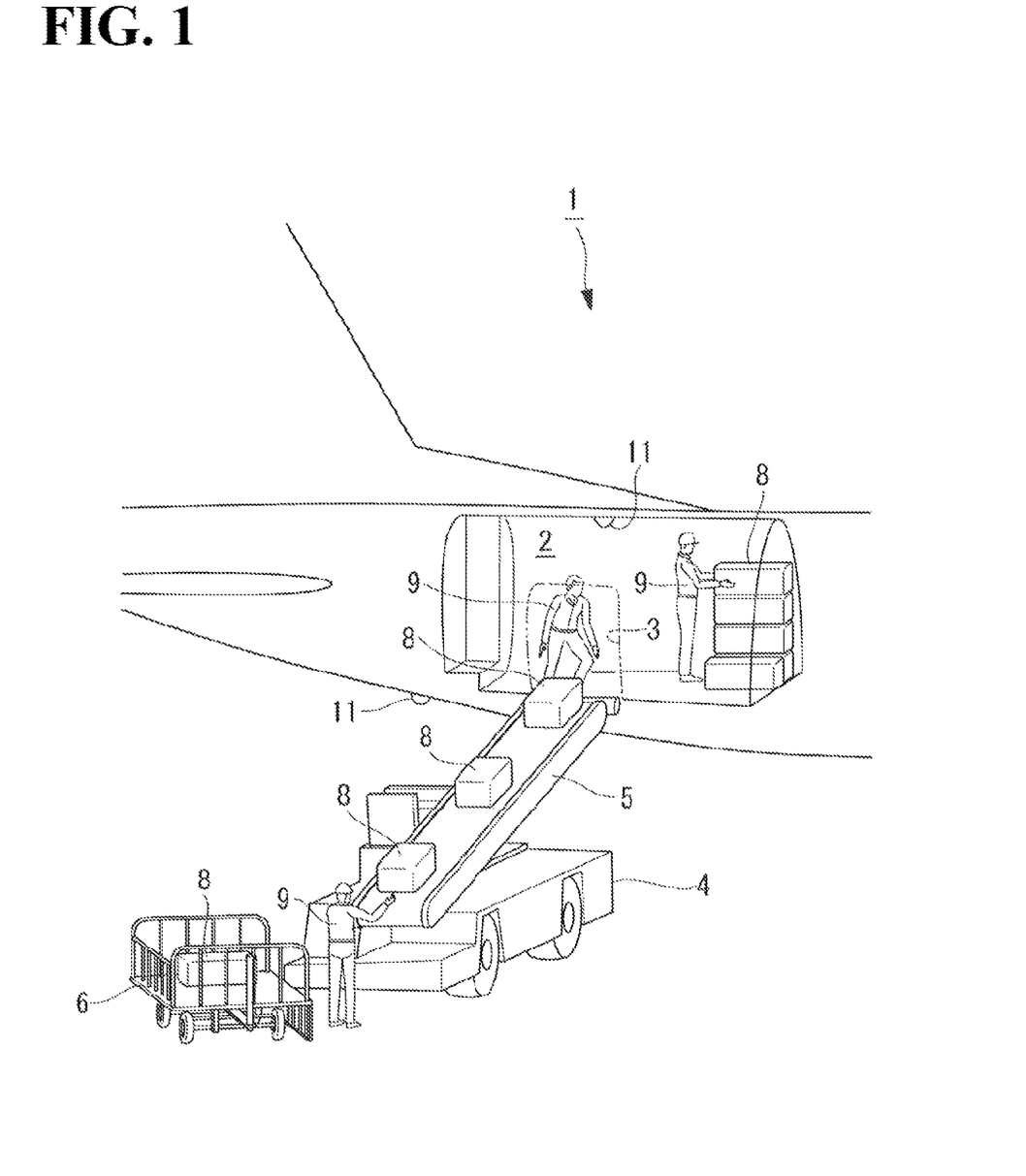
FIG. 1 is a view showing a state in which a loading and unloading operation of cargo is performed in an aircraft on which an inclination detection device according to an embodiment of the present invention is mounted.

FIG. 1 is a view showing a situation where a loading and unloading operation of cargo is performed in a cargo compartment of an aircraft. A fuselage 1 is provided with a cargo compartment 2 at a tail portion thereof, and loading and unloading of cargo are performed from an opening portion 3 provided at a right side surface of the fuselage, for example. Outside the opening portion 3, a belt loader vehicle 4 is placed, a conveyer-shaped loader 5 is arranged to reach the opening portion 3, and cargo 8 that is conveyed by a baggage conveying vehicle 6 and the like is carried into the cargo compartment 2 or is carried out of the cargo compartment 2 by a luggage handler 9.

The cargo compartment 2 is provided at the tail portion of the fuselage 1, and therefore, when the cargo 8 is loaded and unloaded into and from the cargo compartment 2, the center of gravity of the fuselage 1 moves back and forth. Further, when cargo is loaded and unloaded into and from another cargo compartment not illustrated that is provided at a front portion or the like of the fuselage 1, a gravity center position of the fuselage 1 similarly moves back and forth. Therefore, loading and unloading operations of cargo are prevented from being performed simultaneously in the cargo compartments at the front portion and the rear portion so that gravity center management of the fuselage 1 is not confused.

When the cargo 8 is loaded into the cargo compartment 2, it is predicted that as a result that the loading weight become excessive, and the loading position excessively leans to a rear side, the fuselage gravity center moves backward from a main landing gear (not illustrated), and a nose landing gear floats up to cause a tailstrike accident in which a fuselage rear portion touches the ground. Further, for example, when cargo with a heavy weight is loaded into the cargo compartment provided at the front portion of the fuselage 1, it is predicted that as a result that the cargo 8 in the cargo compartment 2 provided at the tail portion of the fuselage 1 is unloaded, the fuselage gravity center excessively moves forward, and a nose landing gear breakage accident occurs.

Therefore, an inclination detection device 11 according to the present invention is mounted on the fuselage 1 and an inclination angle in a pitch direction of the fuselage 1 is monitored. The inclination detection device 11 is installed in a position that is in the vicinity of the cargo compartment 2 and is visually recognizable by the luggage handler 9 who loads and unloads cargo into and from the cargo compartment 2, for example, a ceiling of the cargo compartment 2, a tail portion undersurface of the fuselage 1 or the like. The number of the devices to be installed can be one. The luggage handler 9 performs a loading and unloading operation of cargo while obtaining inclination information of the fuselage 1 from the inclination detection device 11.

Figure 2:
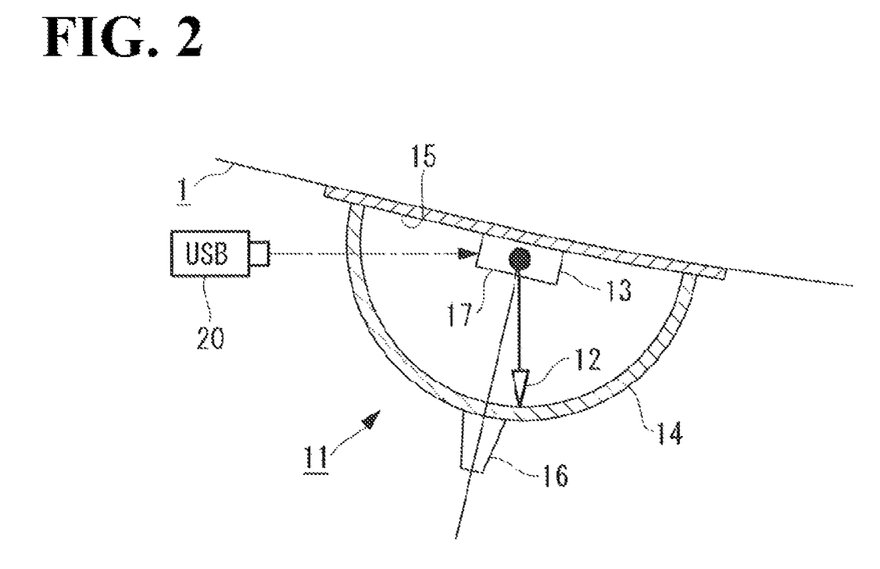
FIG. 2 is a vertical sectional view of the inclination detection device according to the embodiment of the present invention.

The inclination detection device 11 is configured by including, for example, a gravity sensor 13 (inclination angle detection means) including a weight 12, a cover 14 in a semispherical shape (dome shape) covering the gravity sensor 13, a base plate 15 on which the gravity sensor 13 and the cover 14 are mounted, an alarm device 16 (alarm) provided outside the cover 14, and a control unit 17 (control means) that is configured to contain the gravity sensor 13, for example.

The gravity sensor 13 detects an inclination angle in the pitch direction at a parking time of the fuselage 1. Further, the alarm device 16 issues an alarm when the inclination angle detected by the gravity sensor 13 approaches inclination angles of allowable limits in a forward inclination direction and a backward inclination direction of the fuselage 1, and a device that issues a visual alarm such as a rotating warning light, a device that issues an auditory alarm such as a buzzer, the device including a combination of them and the like are conceivable.

The base plate 15 includes suction means such as a suction disk, an adhesive portion, or a magnet, and thereby the inclination detection device 11 can be installed at an arbitrary place of the fuselage. Note that since the inclination detection device 11 can be configured to be light, the inclination detection device 11 may be placed on the fuselage 1 to be stationary. The gravity sensor 13 allows the weight 12 to rotate in a semispherical shape within the range of an angle of about 180 degrees, and detects the inclination angle of the fuselage 1 from a rotation position thereof, and therefore, the base plate 15 is installed on the fuselage 1 in such a manner that the cover 14 is on a lower side from the base plate 15 so that the weight 12 is naturally suspended by the gravity.

Further, the inclination detection device 11 has vibration isolation means between the gravity sensor 13 and the fuselage 1, and thereby vibration from the fuselage 1 is isolated. In the embodiment, for example, the base plate 15 is formed of a rubber, a soft resin or the like, whereby the base plate 15 itself is given a role as the vibration isolation means. However, this is not restrictive, and a structure, for example, in which a vibration insulation member such as a cushion and a spring is interposed between the base plate 15 and the gravity sensor 13 (the control unit 17) may be adopted.

Further, gravity center management information peculiar to the fuselage 1 is configured to be inputted into the control unit 17 by, for example, a storage medium such as a USB memory 20. The gravity center management information peculiar to the fuselage 1 is information indicating a present state of a fuselage gravity center position following a change when an amount of the cargo 8 loaded in the cargo compartment 2 changes, or the number of passengers on board, the loading amount of fuel and the like change, when the fuselage 1 flies by way of another airport. Note that the information may be directly inputted into the control unit 17 by the luggage handler 9 by providing a ten key console panel in the inclination detection device 11 or the like, without being limited to the USB memory 20.

Figure 3:
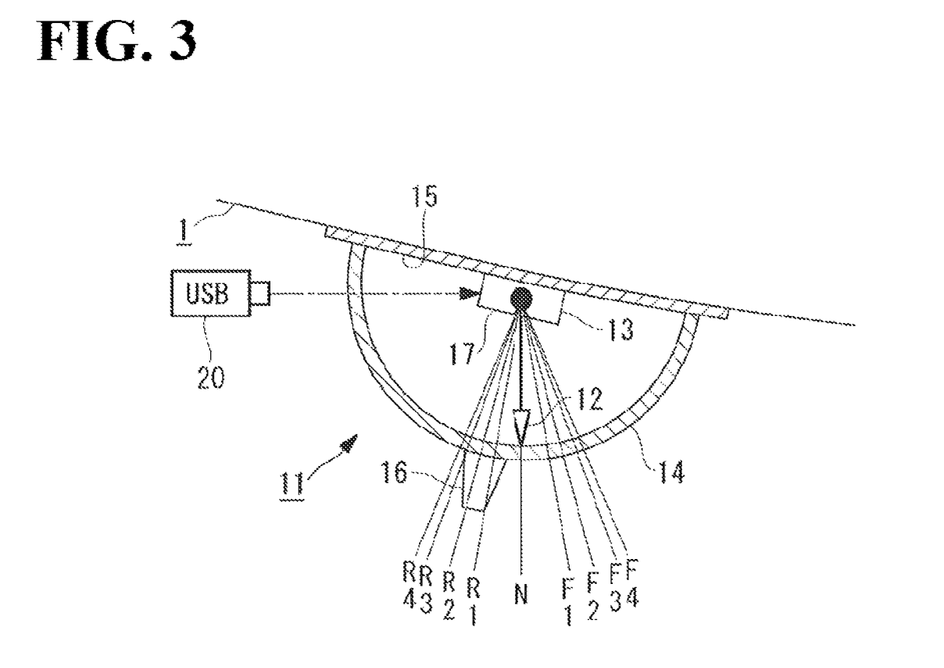
FIG. 3 is a vertical sectional view of the detection device showing a state in which a control unit sets a limit inclination angle in a state in which a fuselage is not inclined in a pre-stage of the loading and unloading operation of cargo.

When the inclination detection device 11 is mounted to the fuselage 1, the weight 12 of the gravity sensor 13 hangs down vertically by the gravity, and a position at which the gravity sensor 13 hangs down is made as a neutral angle N as shown in FIG. 3, and a range of inclination angles detected by the gravity sensor 13 is reset by the control unit 17. Subsequently, a caution angle F1, a warning angle F2, a danger angle F3 and a limit inclination angle F4 are set toward a front side of the fuselage 1, with the neutral angle N as a center, for example. Further, a caution angle R1, a warning angle R2, a danger angle R3 and a limit inclination angle R4 are set toward a rear side of the fuselage 1.

When the neutral angle N is set as a starting point, an angle to each of the caution angles F1 and R1 is set at, for example, 2°, an angle to each of the warning angles F2 and R2 is set at 3°, an angle to each of the danger angles F3 and R3 is set at 4°, and an angle to each of the limit inclination angles F4 and R4 is set at 4.5°. The limit inclination angle F4 refers to an inclination angle in a vicinity of a limit at which the probability of the fuselage 1 causing a nose landing gear breakage accident becomes high, and the limit inclination angle R4 refers to an inclination angle in a vicinity of a limit at which the probability of the fuselage 1 causing a tailstrike accident becomes high. Accordingly, an angle range substantially from F3 to N to R3 is a movable range that is allowed in the forward inclination direction and the backward inclination direction of the fuselage 1. Note that the numeric values of these angles differ in accordance with the aircraft model, the use situation and the like, and only the examples thereof are shown here.

When the fuselage 1 is completely horizontal, a cargo loading and unloading operation in the cargo compartment 2 is started in a state in which the weight 12 of the inclination detection device 11 is at the neutral angle N, as shown in FIG. 3. As the cargo 8 is loaded and unloaded into and from the cargo compartment 2, the center of gravity of the fuselage 1 moves back and force, and when the fuselage 1 starts to incline backward or forward, the weight 12 of the gravity sensor 13 deviates from the neutral angle N. Subsequently, at a time point when the weight 12 reaches the caution angle R1 or F1, the control unit 17 causes the alarm device 16 to issue an alarm.

Intensity of the alarm issued from the alarm device 16 is increased stepwise as the inclination angle of the fuselage 1 approaches the limit inclination angles F4 and R4. For example, this is in such a manner that a buzzer makes a sound at a low sound level at the caution angles R1 and F1, the buzzer makes a sound at an intermediate sound level at the warning angles F2 and R2, the buzzer makes a sound at a large sound level at the danger angles F3 and R3, and at the limit inclination angles F4 and R4, the buzzer makes a sound at a large sound level, at the same time as which, a rotating warning light illuminates.

Further, the kind of the alarm that is issued from the alarm device 16 is preferably made to differ in accordance with whether the inclination direction of the fuselage 1 is in the forward inclination direction or in the backward inclination direction. Namely, clear differentiation is preferably made in such a manner that, for example, the buzzer makes different sounds, when the weight 12 deviates in the directions of F1 to F4 from the neutral angle N, and when the weight 12 deviates in the directions of R1 to R4 from the neutral angle N, or a voice that expresses forward inclination or backward inclination is produced.

Furthermore, as described above, inclination information peculiar to the fuselage 1 is inputted in the control unit 17 by the storage medium such as the USB memory 20 before a loading and unloading operation of the cargo 8 into and from the cargo compartment 2. Namely, the gravity center position of the fuselage 1 calculated based on the data of the loading amounts and the loading positions of the cargo and fuel, the number of passengers and crew on board and the like of the fuselage 1 before a loading and unloading operation of the cargo is performed is inputted in the control unit 17, and based on the information, the control unit 17 corrects an allowable range until the inclination angle reaches the limit inclination angles F4 and R4 in the forward inclination direction and the backward inclination direction of the fuselage 1. The inclination information (gravity center information) of the fuselage 1 is provided from a control center that manages the operation situation of the fuselage 1 or the like.

Figure 4:
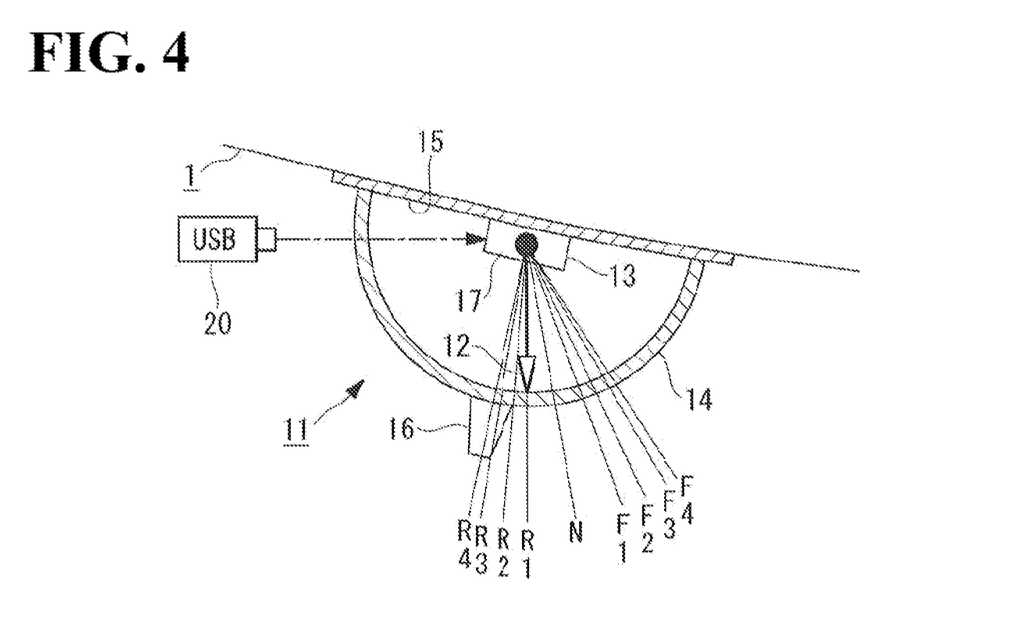
FIG. 4 is a vertical sectional view of the detection device showing a state in which the control unit corrects an allowable range until an inclination angle reaches the limit inclination angle to a front side when the fuselage is already inclined backward, in the pre-stage of the loading and unloading operation of cargo.

For example, when the gravity center management information that the gravity center position of the fuselage 1 already leans to the rear side is inputted into the control unit 17 at a pre-stage of start of the loading and unloading operation of the cargo 8 into and from the cargo compartment 2, the control unit 17 shifts the movable range until the weight 12 of the gravity sensor 13 reaches the limit inclination angle R4 at the backward inclination side to a front side. A shift amount thereof is determined in accordance with the present gravity center position of the fuselage 1.

Consequently, at a point of time when the loading and unloading operation is started, the weight 12 is not located at the neutral angle N, but is located, for example, in a vicinity of the caution angle R1 or the like. Thereby, at the point of time when the loading and unloading operation is started, an alarm about cautioning against backward inclination is already issued (or right before it is issued), and if loading and unloading by which the center of gravity further moves backward is performed from this point of time, a louder alarm is immediately issued. Accordingly, before a tailstrike accident of the fuselage 1 occurs, the luggage handler can grasp the inclination state of the fuselage, and a tailstrike accident can be prevented.

Figure 5:
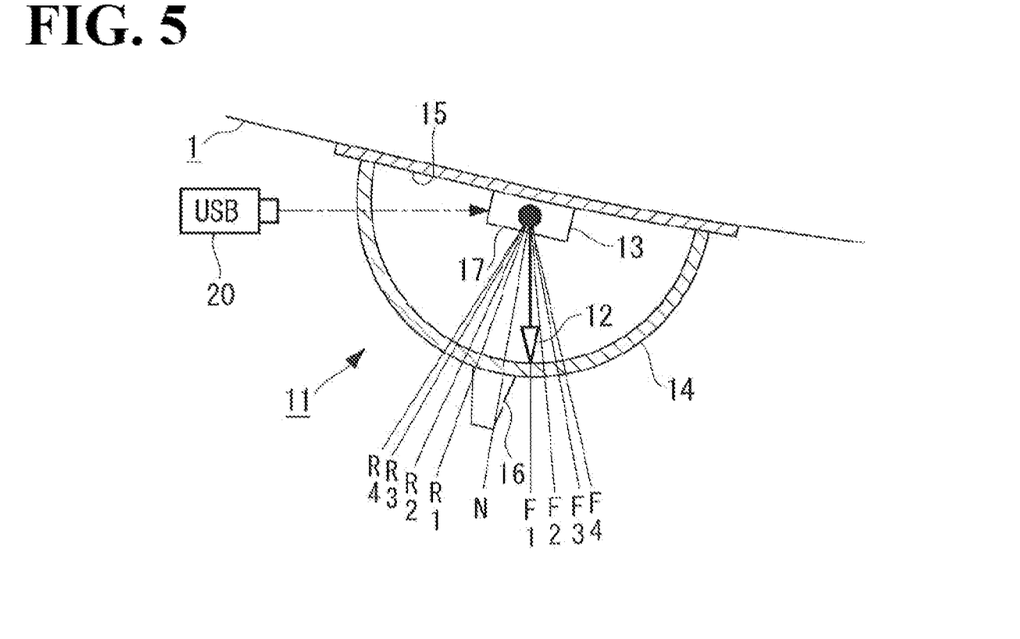
FIG. 5 is a vertical sectional view of the detection device showing a state in which the control unit corrects the allowable range until the inclination angle reaches the limit inclination angle to a rear side when the fuselage is already inclined forward, in the pre-stage of the loading and unloading operation of cargo.

Further, when the gravity center management information indicating that the gravity center position of the fuselage 1 already leans to the front side is inputted into the control unit 17 at the pre-stage of start of a loading and unloading operation of the cargo 8 into and from the cargo compartment 2, the control unit 17 shifts the movable range until the weight 12 of the gravity sensor 13 reaches the limit inclination angle F4 at the forward inclination side to a rear side as shown in FIG. 5. A shift amount thereof is determined in accordance with the present gravity center position of the fuselage 1.

Consequently, at the point of time when a loading and unloading operation is started, the weight 12 is not located at the neutral angle N, but is located in, for example, the vicinity of the caution angle F1 or the like. Thereby, at the time point when the loading and unloading operation is started, an alarm of a forward inclination caution is already issued (or right before it is issued), and when loading and unloading by which the center of gravity is further shifted forward is performed from this point of time, a louder alarm is immediately issued. Accordingly, the luggage handler can grasp the inclination state of the fuselage before a nose landing gear breakage accident of the fuselage 1 occurs, and a nose landing gear breakage accident can be prevented.

According to the inclination detection device 11 configured as above, the inclination angle in the pitch direction of the fuselage 1 is detected by the gravity sensor 13 when the cargo 8 is loaded and unloaded into and from the cargo compartment 2, and when the detected inclination angle approaches the allowable limit inclination angles F4 and R4 in the forward inclination direction and the backward inclination direction of the fuselage 1, the control unit 17 causes the alarm device 16 to issue an alarm.

Consequently, even if the inclination angle in the pitch direction of the fuselage 1 approaches the limit inclination angles F4 and R4 while the luggage handler who loads and unloads the cargo 8 into and from the cargo compartment 2 of the fuselage 1 is performing a loading and unloading operation in accordance with the set procedures, an alarm is issued by the inclination detection device 11, whereby the luggage handler temporarily stops the loading and unloading operation, and can confirm the present situation of the fuselage attitude. Accordingly, a tailstrike accident and a nose landing gear breakage accident of the fuselage 1 can be prevented.

Further, the gravity center management information peculiar to the fuselage 1 is inputted into the control unit 17 before a loading and unloading operation of the cargo 8 into and from the cargo compartment 2, and based on the gravity center management information, the control unit 17 corrects the movable range in the forward inclination direction and the backward inclination direction until the fuselage 1 reaches the limit inclination angles F4 and R4. Consequently, even if the amount of cargo loaded in the cargo compartment 2 changes, or the number of passengers on board, the loading amount of fuel and the like change, when the fuselage 1 flies by way of another airport, the gravity center management information peculiar to the fuselage 1 as above is inputted into the control unit 17, and based on the information, the control unit 17 corrects the movable range in the forward inclination direction and the backward inclination direction until the inclination angle reaches the limit inclination angles F4 and R4 again.

Thereby, for example, when the gravity center position of the fuselage 1 already leans to the rear side (or the front side), the movable range to the limit inclination angles F4 and R4 is shifted to the rear side (or the front side), and if, from here, loading and unloading by which the gravity center is shifted to the rear side (or the front side) is performed, an alarm is immediately issued. Accordingly, a tailstrike accident and a nose landing gear breakage accident of the fuselage 1 can be prevented more reliably.

Since the inclination detection device 11 can be installed in an arbitrary place of the fuselage 1, the inclination detection device 11 is installed inside the cargo compartment 2 or in the vicinity thereof, and can cause the luggage handler 9 who loads and unloads the cargo 8 into and from the fuselage 1 to recognize an alarm reliably to enhance safety, and a loading and unloading operation of the cargo 8 can be smoothly performed.

Further, the base plate 15 is formed to be pliable, whereby the base plate 15 itself is given the role as the vibration isolation means, and the vibration from the fuselage 1 is isolated from the gravity sensor 13. Therefore, vibration accompanying external wind, loading of cargo, boarding and alighting of passengers and the like is hardly applied to the gravity sensor 13. Therefore, for example, the event is prevented, that when the weight 12 of the gravity sensor 13 is in the vicinity of a critical point of the caution angle R1 or F1, the gravity sensor 13 reacts oversensitively due to the influence of the vibration of the fuselage 1 to cause the alarm device 16 to issue an alarm (erroneous alarm), whereby a loading and unloading operation of the cargo 8 can be smoothly performed without being suspended.

Meanwhile, since the intensity of the alarm that the alarm device 16 issues is increased stepwise as the inclination angle of the fuselage 1 approaches the limit inclination angles F4 and R4, the luggage handler 9 who loads and unloads the cargo 8 into and from the fuselage 1 can recognize that the limit of the inclination angle approaches, and at the same time, the luggage handler can load and unload cargo so that the limit of the inclination angle recedes conversely. Namely, for example, when the intensity of an alarm is increased at the instant of the specific cargo 8 being loaded into the rearmost portion of the cargo compartment 2, the alarm can be made less intense, by adding a change in which the cargo 8 is loaded into a front portion of the cargo compartment 2, or the cargo 8 is loaded into the cargo compartment at the front side. Accordingly, a loading and unloading operation can be smoothly performed without being suspended.

Further, when the kind of the alarm that the alarm device 16 issues is made to differ depending on whether the inclination direction of the fuselage 1 is the forward inclination direction or the backward inclination direction, the luggage handler 9 who recognizes the alarm can know the inclination direction of the fuselage 1, and therefore, can release the alarm by immediately loading and unloading the cargo 8 so the fuselage is inclined in the opposite direction. Therefore, the loading and unloading operation can be smoothly performed without being suspended.

A method for loading and unloading cargo according to the present invention is such that the luggage handler 9 who loads and unloads the cargo 8 into and from the cargo compartment 2 of the fuselage 1 performs a loading and unloading operation of the cargo 8 while obtaining gravity center management information of the fuselage 1 from the inclination detection device 11, and therefore, the luggage handler 9 can properly load and unload the cargo 8 while grasping the gravity center information (the inclination state) of the fuselage 1. Thereby, a tailstrike accident and a nose landing gear breakage accident of the fuselage 1 can be prevented, and a loading and unloading operation of the cargo 8 can be smoothly performed.

Note that the present invention is not limited to only the configuration of the above described embodiment, and modifications can be added to the invention to such an extent as not to depart from the claims. In particular, the configuration of the inclination detection device 11 does not always have to be the configuration of the above described embodiment. For example, instead of using the gravity sensor 13 as the inclination angle detection means, a laser level, and other angle detection means may be used.

REFERENCE SIGNS LIST

1 FUSELAGE
2 CARGO COMPARTMENT
8 CARGO
9 LUGGAGE HANDLER
11 INCLINATION DETECTION DEVICE
12 WEIGHT
13 GRAVITY SENSOR (INCLINATION ANGLE DETECTION MEANS)
14 COVER
15 BASE PLATE (VIBRATION ISOLATION MEANS)
16 ALARM DEVICE (ALARM)
17 CONTROL UNIT (CONTROL MEANS)
20 USB MEMORY
F4, R4 LIMIT INCLINATION ANGLE

The invention claimed is:

1. An inclination detection device for an aircraft, comprising:
   an inclination angle detection means that detects an inclination angle in a pitch direction at a parking time of a fuselage;
   an alarm; and
   a control means that causes the alarm to issue an alarm when the inclination angle detected by the inclination angle detection means approaches an allowable limit inclination angle in a forward inclination direction or when the inclination angle detected by the inclination angle detection means approaches an allowable limit inclination angle in a backward inclination direction of the fuselage,
   wherein the control means has gravity center management information peculiar to the fuselage inputted therein, and corrects a movable range in the forward inclination direction and the backward inclination direction until the inclination angle reaches the limit inclination angles based on the gravity center management information, before a loading and unloading operation of cargo into and from the fuselage.

2. The inclination detection device for an aircraft according to claim 1, wherein the inclination detection device is installed on a place of the fuselage.

3. The inclination detection device for an aircraft according to claim 1, wherein intensity of the alarm that the alarm issues is increased stepwise as the inclination angle of the fuselage approaches the limit inclination angles.

4. The inclination detection device for an aircraft according to claim 1, wherein the alarm that the alarm issues differs depending on whether the inclination direction of the fuselage is the forward inclination direction or the backward inclination direction.

5. An inclination detection device for an aircraft, comprising:
- an inclination angle detection means that detects an inclination angle in a pitch direction at a parking time of a fuselage;
- an alarm; and
- a control means that causes the alarm to issue an alarm when the inclination angle detected by the inclination angle detection means approaches an allowable limit inclination angles in a forward inclination direction or when the inclination angle detected by the inclination angle detection means approaches an allowable limit inclination angle in a backward inclination direction of the fuselage,
- wherein a vibration isolation means that isolates vibration from the fuselage is included between the inclination angle detection means and the fuselage.

6. The inclination detection device for an aircraft according to claim 5, wherein the inclination detection device is installed on a place of the fuselage.

7. The inclination detection device for an aircraft according to claim 5, wherein intensity of the alarm that the alarm issues is increased stepwise as the inclination angle of the fuselage approaches the limit inclination angles.

8. The inclination detection device for an aircraft according to claim 5, wherein the alarm that the alarm issues differs depending on whether the inclination direction of the fuselage is the forward inclination direction or the backward inclination direction.

9. A method for loading and unloading cargo, wherein a luggage handler who loads and unloads cargo into and from a cargo compartment of a fuselage performs a loading and unloading operation of the cargo while obtaining gravity center management information of the fuselage by the inclination detection device for an aircraft according to claim 1.

10. A method for loading and unloading cargo, wherein a luggage handler who loads and unloads cargo into and from a cargo compartment of a fuselage performs a loading and unloading operation of the cargo while obtaining gravity center management information of the fuselage by the inclination detection device for an aircraft according to claim 5.

* * * * *